United States Patent
Hsieh

(10) Patent No.: US 7,072,464 B2
(45) Date of Patent: Jul. 4, 2006

(54) NETWORK COMMUNICATION DEVICE AND HYBRID CIRCUIT THEREOF

(75) Inventor: Ming-En Hsieh, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 32 days.

(21) Appl. No.: 10/793,918

(22) Filed: Mar. 8, 2004

(65) Prior Publication Data

US 2005/0141697 A1    Jun. 30, 2005

(30) Foreign Application Priority Data

Dec. 26, 2003   (TW) ............................... 92137020 A

(51) Int. Cl.
*H04M 1/00*   (2006.01)

(52) U.S. Cl. .................... 379/402; 379/398; 379/93.05

(58) Field of Classification Search ................ 379/402, 379/398, 399.01, 93.05
See application file for complete search history.

(56) References Cited

U.S. PATENT DOCUMENTS 6,792,104 B1* 9/2004 Schley-May ................ 379/391
2003/0112963 A1* 6/2003 Chen et al. ............ 379/399.01

* cited by examiner

*Primary Examiner*—Jefferey F. Harold
(74) *Attorney, Agent, or Firm*—Birch, Stewart, Kolasch & Birch, LLP

(57) ABSTRACT

A network communication device and hybrid circuit thereof. The hybrid circuit includes a first transformer, a second transformer and a protector electrically connected between the primary winding of the first transformer and the primary winding of the second transformer for protecting transmission function of internet and inhibiting interference of low-frequency signals generated during the communication process.

12 Claims, 3 Drawing Sheets

US 7,072,464 B2

NETWORK COMMUNICATION DEVICE AND HYBRID CIRCUIT THEREOF

This Nonprovisional application claims priority under 35 U.S.C. § 119(a) on Patent Application No(s). 092137020 filed in TAIWAN on Dec. 26, 2003, the entire contents of which are hereby incorporated by reference.

BACKGROUND OF THE INVENTION

1. Field of the Invention

The present invention relates in general to a network communication device, and specifically to a hybrid circuit used in a frequency division duplexing(FDD) system to protect transmission function and inhibit interference of low-frequency signals generated during the communication process.

2. Description of the Related Art

The demand for transmission speed, time, quality and function of networks has become higher as networks become more and more popular. The network communication method most widely used in high-speed data transmission is XDSL, such as asymmetric digital subscriber line (ADSL) modem, through traditional telephone lines.

Referring to FIG. 1, an ethernet broadband communication system based on XDSL technology is shown. The communication system includes a subscriber 1 and a central office 2. The subscriber 1 is connected to the central office 2 through a twisted pair line. The subscriber 1 includes an XDSL modem 11 and a personal computer or computer network 12. The central office 2 includes a patch panel splitter 21 connected to the XDSL modem 11, a private branch exchange(PBX) 22 connected to the public switched telephone network(PSTN) and an internet access router 23 connected to the internet.

Referring to FIG. 2, a block diagram of the XDSL modem in FIG. 1 is shown. The subscriber is provided with a plain old telephone service(POTS) splitter 13 to connect the XDSL modem 11 and a network line. The XDSL modem 11 has a hybrid circuit 111 to couple a transmitter TX and a receiver RX to the network line. An analog signal is transmitted to the filter 113 of the transmitter TX and the filtered analog signal is transmitted to the hybrid circuit 111. The receiver RX receives the signal from the hybrid circuit 111.

Currently, the communication transformer design used in current FDD networking products uses a hybrid circuit to accomplish insulation/impedance allocation between the primary winding and the secondary winding. The hybrid circuit plays an important role in impedance matching and signal power distribution between the upstream and downstream of a broadband network. However, when the broadband network is in operation, the hybrid circuit can't inhibit/absorb the low-frequency AC signals generated by a ringing or hook on/off such that the packets through the network can not be completely received, i.e. cyclical redundancy check (CRC) error. Furthermore, the network may be disconnected and it generates a significant impact on transmission functionality of internet.

SUMMARY OF THE INVENTION

One object of the present invention is to provide a network communication device and its hybrid circuit to maintain excellent communication quality of a network communication system.

Another object of the present invention is to provide a hybrid circuit used in FDD network communication system to protect transmission function of internet and inhibit interference from low-frequency signals generated during the communication process.

According to the present invention, the network communication device includes a transmitter, a receiver and a hybrid circuit coupled between the transmitter and the receiver. The hybrid circuit includes a first transformer provided with a primary winding and a secondary winding, a second transformer provided with a primary winding and a secondary winding, and a protector electrically connected between the primary winding of the first transformer and the primary winding of the second transformer to inhibit low-frequency signals generated during the communication process. The transmitter and the receiver each has at least one filter, and the protector is a capacitor or a circuit having a capacitor.

In addition, the hybrid circuit further includes an impedance matching element electrically connected between one of the secondary windings of the first transformer and one of the secondary windings of the second transformer. The impedance matching element can be a resistor.

Preferably, the network communication device according to the present invention can be an asymmetric digital subscriber line(ADSL), a high-bit-rate digital subscriber line (HDSL), a rate adaptive digital subscriber line(RADSL), a symmetric digital subscriber line(SDSL), a very high-bit-rate digital subscriber line(VDSL), or other modems in the form of DSL.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
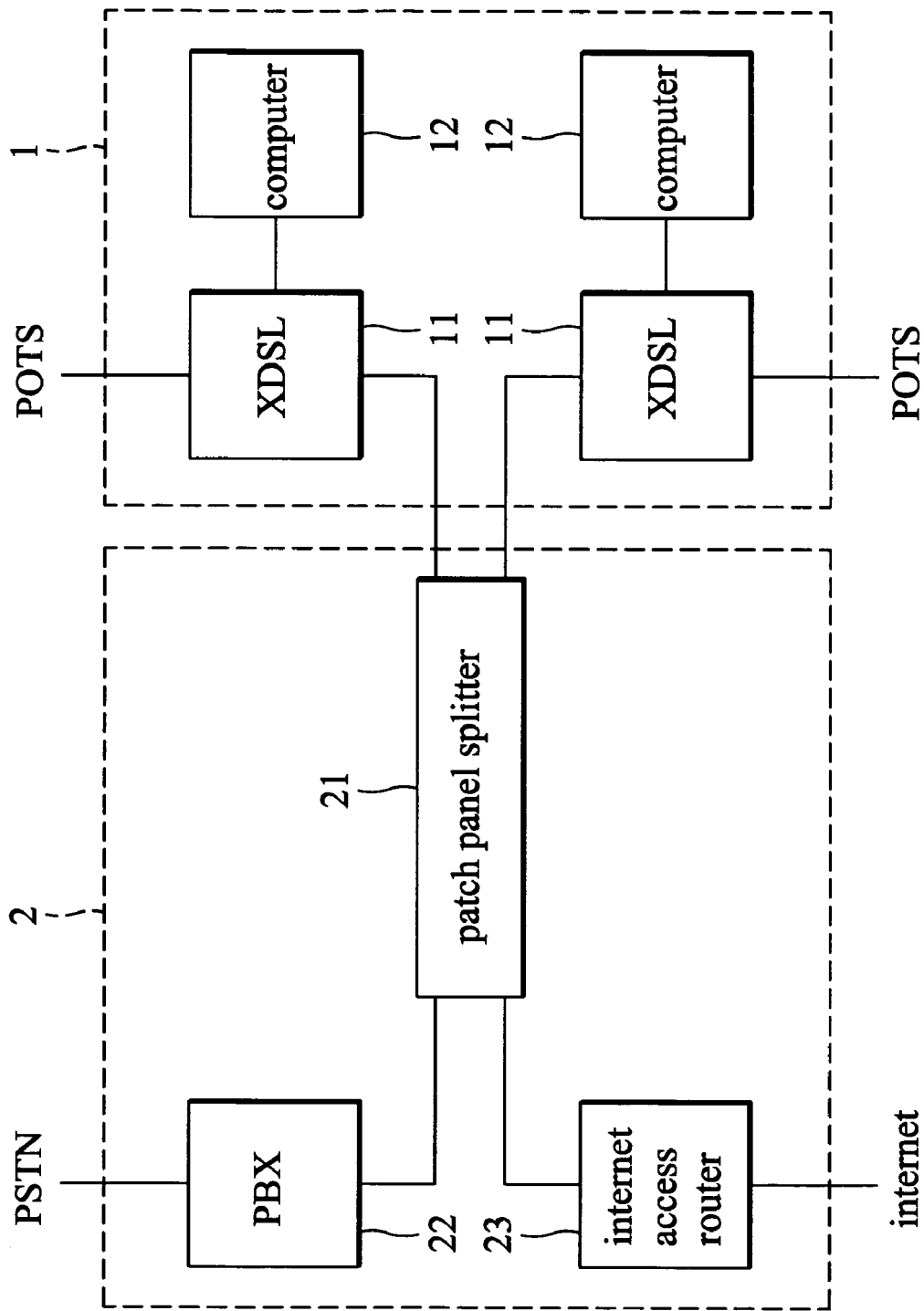
FIG. 1 is a block diagram of an ethernet broadband communication system based on XDSL technology.
Figure 2:
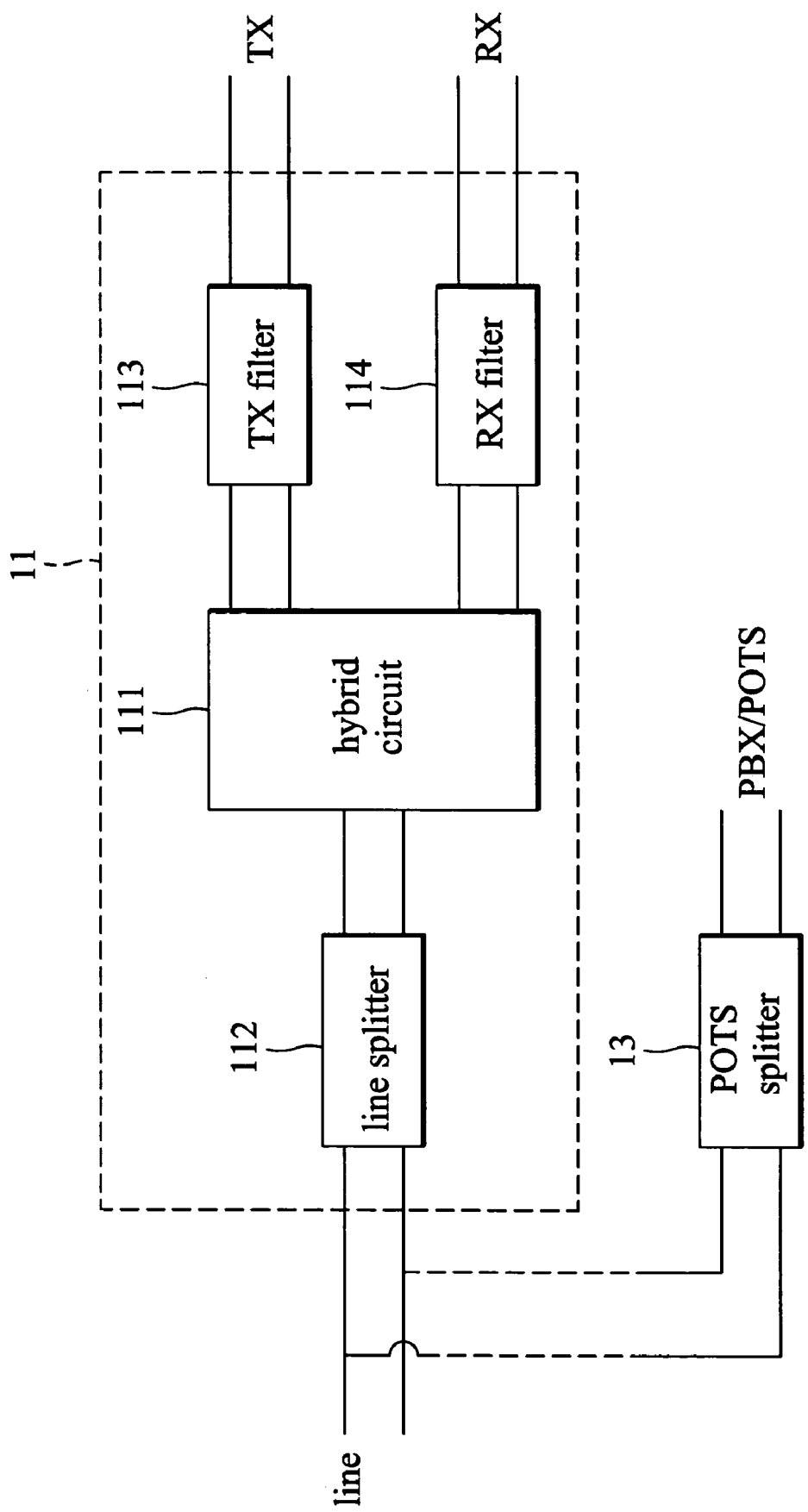
FIG. 2 is a schematic view of the XDSL modem shown in FIG. 1.
Figure 3:
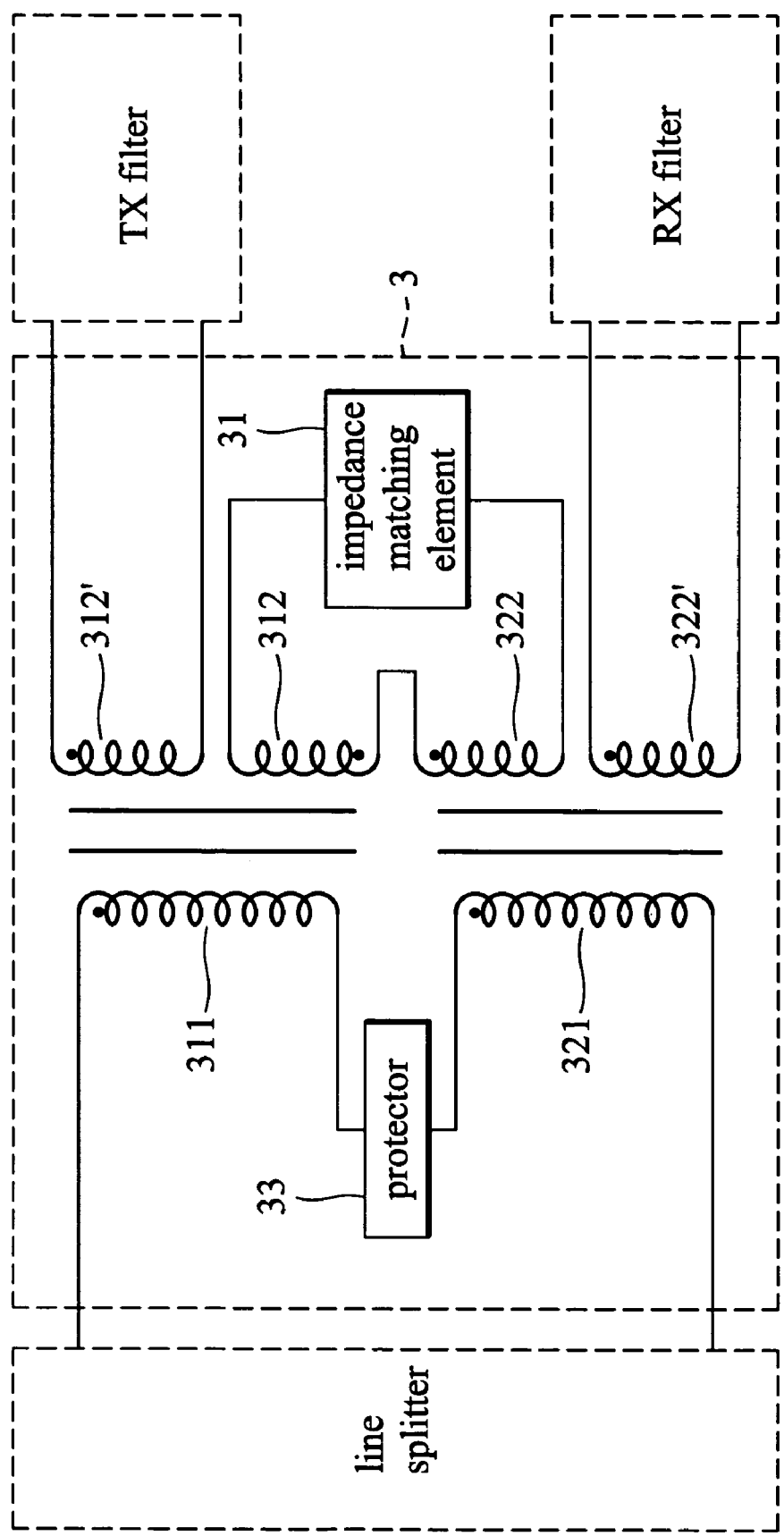
FIG. 3 is a block diagram of the hybrid circuit according to the present invention.

FIG. 3 is a block diagram of the hybrid circuit according to the present invention. The hybrid circuit 3 is electrically connected between the transmitter TX and the receiver RX, and includes a first transformer, a second transformer, and a protector 33 electrically connected between the primary winding 311 of the first transformer and the primary winding 321 of the second transformer. In addition, the hybrid circuit further includes an impedance matching element 34 electrically connected between one of the secondary windings 312 of the first transformer and one of the secondary windings 322 of the second transformer. Moreover, the transmitter and the receiver have at least one filter, respectively.

According to the present invention, a protector 33 is connected in series between the primary windings of the two transformers in the hybrid circuit to be charged and discharged so as to inhibit/absorb low-frequency AC signals generated by a ringing or hook on/off. The protector may be a capacitor or a circuitry combination thereof.

When a low-frequency AC signal is generated by a ringing or hook on/off, it is transmitted to the line splitter connected with the POTS splitter in parallel through the POTS splitter. A small portion of signal power directly enters the hybrid circuit through the line splitter, whereas the charging/discharging protector can inhibit/absorb the common-mode or differential-mode signal power entering the hybrid circuit. Thus, the filters of the transmitter and the receiver behind the hybrid circuit are protected, ensuring intact network function regardless of a ringing or hook on/off.

The hybrid circuit according to the present invention can be used in FDD network device/system design, wherein the protector changes a pair of twisted lines to four lines and can protect transmission function and inhibit interference of low-frequency signals generated by a ringing or hook on/off. The charging/discharging of the protector is utilized to absorb the transient low-frequency signal voltage or current. Thus, deterioration of transmission quality of the communication network is avoided.

Finally, while the present invention has been described by way of example and in terms of the ADSL modem, it is to be understood that the present invention can be used in other modems in the form of DSL, such as a high-bit-rate digital subscriber line(HDSL), a rate adaptive digital subscriber line(RADSL), a symmetric digital subscriber line(SDSL) or a very high-bit-rate digital subscriber line(VDSL). Accordingly, the disclosure is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A hybrid circuit for coupling a network communication device to a network line, comprising:
   a first transformer, provided with a primary winding and a secondary winding;
   a second transformer, provided with a primary winding and a secondary winding; and
   a protector electrically connected between the primary windings of the first transformer and the second transformer to suppress generation of relatively low-frequency signals during a communication process.

2. The hybrid circuit as claimed in claim 1, wherein the protector comprises a capacitor or a circuit having a capacitor.

3. The hybrid circuit as claimed in claim 1, further comprising an impedance matching element electrically connected between one of the secondary windings of the first transformer and one of the secondary windings of the second transformer.

4. The hybrid circuit as claimed in claim 3, wherein the impedance matching element is a resistor.

5. The hybrid circuit as claimed in claim 1, wherein the network communication device may be an asymmetric digital subscriber line(ADSL), a high-bit-rate digital subscriber line(HDSL), a rate adaptive digital subscriber line(RADSL), a symmetric digital subscriber line(SDSL), a very high-bit-rate digital subscriber line(VDSL), or other modems in the form of DSL.

6. A network communication device comprising:
   a transmitter;
   a receiver;
   a hybrid circuit, which couples a network communication device to a network line, the hybrid circuit comprising:
      a first transformer provided with a primary winding and a secondary winding;
      a second transformer provided with a primary winding and a secondary winding; and
      a protector electrically connected between the primary windings of the first transformer and the second transformer to suppress generation of relatively low-frequency signals during communication process.

7. The network communication device as claimed in claim 6, wherein the transmitter comprises at least one filter.

8. The network communication device as claimed in claim 6, wherein the receiver comprises at least one filter.

9. The network communication device as claimed in claim 6, wherein, the protector is a capacitor or a circuit having a capacitor.

10. The network communication device as claimed in claim 6, further comprising an impedance matching element electrically connected between one of the secondary windings of the first transformer and one of the secondary windings of the second transformer.

11. The network communication device as claimed in claim 10, wherein the impedance matching element is a resistor.

12. The hybrid circuit as claimed in claim 6, wherein the network communication device is an asymmetric digital subscriber line (ADSL), a high-bit-rate digital subscriber line(HDSL), a rate adaptive digital subscriber line(RADSL), a symmetric digital subscriber line (SDSL), a very high-bit-rate digital subscriber line(VDSL), or other modems in the form of DSL.

* * * * *